US012646966B2

(12) United States Patent
Sterna et al.

(10) Patent No.: US 12,646,966 B2
(45) Date of Patent: Jun. 2, 2026

---

(54) UNINTERRUPTIBLE POWER SUPPLY CIRCUIT COMPRISING A BUCK-BOOST VOLTAGE CONVERTER

(71) Applicant: COMMISSARIAT A L'ENERGIE ATOMIQUE ET AUX ENERGIES ALTERNATIVES, Paris (FR)

(72) Inventors: Léo Sterna, Grenoble (FR); Charley Lanneluc, Grenoble (FR); Pierre Perichon, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 181 days.

(21) Appl. No.: 18/666,309

(22) Filed: May 16, 2024

(65) Prior Publication Data

US 2024/0388127 A1 Nov. 21, 2024

(30) Foreign Application Priority Data

May 16, 2023 (FR) ...................................... 2304853

(51) Int. Cl.
H02M 1/10 (2006.01)
H02J 9/06 (2006.01)
(Continued)

(52) U.S. Cl.
CPC .............. *H02J 9/068* (2020.01); *H02M 1/10* (2013.01); *H02M 5/2932* (2021.05);
(Continued)

(58) Field of Classification Search
CPC .. H02J 9/068; H02J 9/062; H02J 4/00; H02M 5/2932; H02M 7/537; H02M 1/10; H02M 5/293; H02M 3/1582
See application file for complete search history.

(56) References Cited

U.S. PATENT DOCUMENTS 9,444,280 B2 9/2016 Lee
11,381,159 B2 7/2022 Afridi et al.
(Continued)

FOREIGN PATENT DOCUMENTS

EP 3 563 475 B1 1/2022
WO 2013/130054 A1 9/2013

OTHER PUBLICATIONS

Shahzad, et al., "GaN-Based High-Power-Density AC-DC-AC Converter for Single-Phase Transformerless Online Uninterruptible Power Supply", IEEE Transactions on Power Electronics, vol. 36, Issue: 12, pp. 13968-13984, Dec. 2021.
(Continued)

*Primary Examiner* — Crystal L Hammond
*Assistant Examiner* — Jonathan Walter Soileau
(74) *Attorney, Agent, or Firm* — BakerHostetler

(57) ABSTRACT

An uninterruptible power supply circuit configured to, in a first operating mode, supply power to a second AC electrical network from a first AC electrical network; and, in a second operating mode, supply power to the second AC electrical network from a DC voltage source. The circuit comprises a buck-boost voltage converter comprising two input terminals which are configured to, in the first operating mode, receive, between them, an AC voltage from the first network; and, in the second operating mode, receive a DC voltage from the DC voltage source; and two output terminals configured to, in the first and the second operating mode, receive, between then, an AC voltage from the second AC electrical network; the buck-boost voltage converter being configured to, in the first operating mode, perform an AC/AC conversion between the first AC electrical network and the second AC electrical network.

10 Claims, 4 Drawing Sheets

(51) Int. Cl.
　　　*H02M 5/293*　　　(2006.01)
　　　*H02M 7/537*　　　(2006.01)
　　　*H02M 3/158*　　　(2006.01)

(52) U.S. Cl.
　　　CPC ............. *H02M 7/537* (2013.01); *H02J 9/062*
　　　　　　　(2013.01); *H02M 3/1582* (2013.01); *H02M*
　　　　　　　　　　　　　　　　　*5/293* (2013.01)

(56)　　　　　　　　References Cited

U.S. PATENT DOCUMENTS

| | | | |
|---|---|---|---|
| 2002/0118556 A1* | 8/2002 | Johnson, Jr. ............ | H02M 1/10 |
| | | | 363/123 |
| 2008/0055940 A1* | 3/2008 | Lawson ................... | G05F 1/10 |
| | | | 363/75 |
| 2013/0234613 A1 | 9/2013 | Mccune, Jr. | |
| 2015/0070952 A1 | 3/2015 | Ishii et al. | |
| 2022/0181905 A1 | 6/2022 | Agrawal et al. | |
| 2022/0209572 A1* | 6/2022 | Allert ................... | H02J 7/1438 |

OTHER PUBLICATIONS

Bubovich, et al., "Overview of Bidirectional Unfolding Converters for Battery Energy Storage Systems", 2022 IEEE 13th International Symposium on Power Electronics for Distributed Generation Systems (PEDG), 2022.
Khan, et al., "Full-Bridge Single-Inductor-Based Buck-Boost Inverters", IEEE Transactions on Power Electronics, vol. 36, Issue: 2, pp. 1909-1920, 2021.

* cited by examiner

UNINTERRUPTIBLE POWER SUPPLY CIRCUIT COMPRISING A BUCK-BOOST VOLTAGE CONVERTER

CROSS-REFERENCE TO RELATED APPLICATION

This application claims priority to foreign French patent application No. FR 2304853, filed on May 16, 2023, the disclosure of which is incorporated by reference in its entirety.

FIELD OF THE INVENTION

The invention relates to an uninterruptible power supply circuit, notably an uninterruptible power supply circuit configured to supply power to a second AC electrical network from a first AC electrical network, and, in the event of a failure of the first AC electrical network, supply power to the second AC electrical network from a DC voltage source.

BACKGROUND

Uninterruptible power supplies or UPSs are electrical devices intended to make continuity of service possible in the event of an interruption in the supply of electric power to an electrical system from an electrical network. By being the interface between the electrical network and the system, the uninterruptible power supply may also improve the quality of the energy offered by the electrical network. Banks, hospitals, universities or data centres are counted among the systems using UPSs.

Typically, a UPS is configured to perform two electrical conversions. In normal operation, the UPS implements an AC/AC conversion in which energy drawn from the AC electrical network is delivered to the AC electrical system. In the event of a failure of the AC electrical network, a DC/AC conversion between a DC electrical energy source, such as a battery, and the AC electrical system is implemented so as to continue supplying power to the AC electrical system.

There are ranges of uninterruptible power supplies which correspond to targeted types of AC/AC conversion. Thus, for domestic or non-critical applications, voltage and frequency dependent or VFD uninterruptible power supplies are known. These VFD power supplies are characterized by a voltage and a frequency which are delivered to the electrical system which depend on those transmitted by the electrical network. These power supplies are generally reserved for applications ranging up to 1500 VA. Voltage independent or VI uninterruptible power supplies are also known. These power supplies are characterized by a voltage delivered to the electrical network which may be controlled independently of the voltage transmitted by the electrical network. The VI power supply may control the voltage delivered to the electrical system. The frequency is, by contrast, generally non-modifiable. This type of power supply is generally reserved for applications ranging up to 5000 VA, such as for computer servers of small enterprises, for example. There are also voltage and frequency independent or VFI uninterruptible power supplies, in which the voltage and the frequency which are delivered to the electrical system may be controlled by the UPS. Such VFI UPSs are generally reserved for applications beyond 5000 VA.

A UPS described in the patent application publication WO2013/130054 A1 is known. This UPS has voltage independent operation, based on a delta conversion. Such a delta conversion uses a transformer one winding of which is connected in series between the electrical network and the electrical system. The voltage across the terminals of this winding is controlled by a converter. The winding of the transformer makes it possible to correct the fluctuations of the electrical network. However, a DC storage capacitor is required for compensating for the harmonics. Such a DC storage capacitor is bulky. The bulk of the UPS is also impacted by the volume and the weight of the transformer. Another drawback of the UPS of this prior art is that controlling the transformer requires monitoring its magnetic flux, which may prove complicated to implement. In addition, if previously delta conversion made it possible to use a converter which is not sized for nominal operation in the AC/AC conversion, switch technologies have progressed a lot in terms of losses with the emergence of SiC or GaN technologies, making it less advantageous to use the delta conversion. Finally, the UPS described in this document has a modular structure which makes it possible for it to have VI or VFI operation. Now, some users may need only the voltage independent functionality, namely a UPS delivering a voltage independent of that delivered by the electrical network but while conserving the frequency of the electrical network.

A voltage independent UPS which has a reduced bulk with respect to the prior art is therefore sought.

SUMMARY OF THE INVENTION

To this end, the invention proposes a power supply circuit as defined in the claims.

BRIEF DESCRIPTION OF THE DRAWINGS

Other features and advantages of the present invention will become more apparent on reading the following description with reference to the following appended figures.

DETAILED DESCRIPTION

Figure 1:
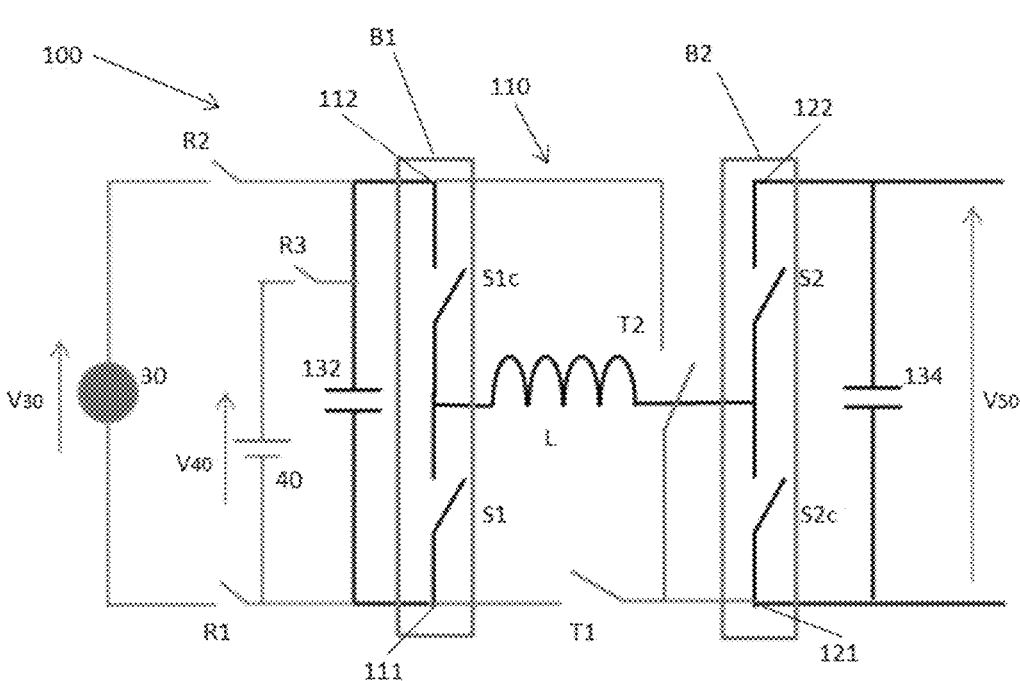
FIG. 1 shows an uninterruptible power supply circuit according to one example of the invention.

FIG. 1 presents an uninterruptible power supply circuit 100 according to one example of the invention. The power supply circuit 100 may have at least two operating modes in order to ensure an uninterrupted supply of power to a second AC electrical network to which it is connected. The second AC electrical network notably belongs to an installation for which any interruption in the supply of electric power must be avoided. Such an installation is, for example, a bank, a hospital, a university or a data centre.

In a first operating mode, the power supply circuit 100 ensures a supply of electric power to the second AC electrical network from a first AC electrical network 30. The first AC electrical network 30 is notably a public electrical network.

In a second operating mode, the power supply circuit 100 ensures a supply of electric power to the second AC electrical network from a DC voltage source 40. Thus, in the event of a failure of the first AC electrical network 30, the DC voltage source 40 makes continuity of the supply of power to the second electrical network possible. In particular, this is a temporary power supply, while a robust electrical source is started up, such as a generator set, for example. The DC voltage source 40 may be, inter alia, a battery, such as, for example, a lithium/lead battery, or a supercapacitor. The battery may be installed in a rack of the uninterruptible power supply circuit 100.

The uninterruptible power supply circuit 100 comprises a buck-boost voltage converter 110. Two input terminals 111, 112 of the buck-boost voltage converter 110 are configured to, in the first operating mode, receive, between them, an AC voltage V30 from the first AC electrical network 30. The first AC electrical network 30 is then connected between the two input terminals 111, 112, notably directly connected between the two input terminals 111, 112. In the second operating mode, the two input terminals 111, 112 of the buck-boost voltage converter 110 receive a DC voltage V40 from the DC voltage source 40. The DC voltage source 40 is then connected between the two input terminals 111, 112, notably directly connected between the two input terminals 111, 112. The buck-boost voltage converter 110 also comprises two output terminals 121, 122 which, in the first and the second operating mode, receive, between them, a voltage V50 from the second AC electrical network. The second AC electrical network is then connected, notably directly connected, between the two output terminals 121, 122.

In the first operating mode, the buck-boost converter 110 performs an AC/AC conversion between the first electrical network 30 and the second electrical network. Buck-boost voltage converters are well known in the prior art for a DC/DC conversion, but not for an AC/AC conversion, in particular in an uninterruptible power supply. The buck-boost voltage converter 110 makes it possible to produce the uninterruptible power supply in a simple manner. Also, given its configuration, it may be reused in the DC/AC conversion of the second operating mode.

Notably, in the first operating mode, the buck-boost voltage converter 110 makes it possible for the power supply circuit 100 to be voltage, but not frequency, independent. In other words, by virtue of the buck-boost voltage converter 110, the power supply circuit 100 notably regulates the effective voltage delivered to the second electrical network, so that it may be different from that delivered by the first electrical network 30. In particular, the buck-boost converter 110 makes it possible to convert an AC voltage V30 from the first AC electrical network 30 into a second AC voltage V50 forming the output voltage delivered to the second AC electrical network; the frequency delivered by the power supply circuit 100 remaining equal to that of the second electrical network 30.

In particular, the buck-boost voltage converter 100 comprises a first switch arm B1 comprising a first switch S1 and a second switch S1c. In particular, each switch S1, S1c has two contact terminals. The two switches S1, S1c have a common terminal which constitutes the midpoint of the first arm B1. End terminals of the first arm B1 form the input terminals 111, 112 of the buck-boost voltage converter 110. In other words, in particular, for each switch S1, S1c, the terminal opposite the midpoint forms an input terminal 111,

112 of the buck-boost voltage converter 110. The buck-boost voltage converter 110 notably comprises a second switch arm B2. Similarly to the first arm B1, the second arm B2 comprises a first switch S2 and a second switch S2c. End terminals of the second arm B2 form the output terminals 121, 122 of the buck-boost voltage converter 110. In other words, in particular, for each switch S2, S2c of the second arm B2, the terminal opposite the midpoint of the second arm forms an output terminal 121, 122 of the buck-boost voltage converter 110.

Notably, the buck-boost voltage converter 110 also comprises an inductor L. The inductor L is connected between the midpoint of the first arm B1 and the midpoint of the second arm B2. In other words, the inductor L notably has two contact terminals: one is connected, notably directly connected, to the midpoint of the first arm B1; the other is connected, notably directly connected, to the midpoint of the second arm B2.

By virtue of the switches S1, S1c, S2, S2c, the buck-boost voltage converter 110 performs a conversion by an accumulation of energy in the inductor L, which makes it possible to raise or lower the voltage between the input and the output. Thus, the uninterruptible power supply circuit 100 makes it possible to ensure, in the first operating mode, a supply of power between a first and a second AC electrical network having, for example, one of the following voltage pairs: 115 Vac/230 Vac, 230 Vac/115 Vac, 115 Vac/115 Vac or 230 Vac/230 Vac. To this end, an input terminal 111 of the buck-boost voltage converter 110 is connected to an output terminal 121 of the buck-boost voltage converter 110, as will be explained below in relation to FIG. 2.

In particular, in the second operating mode, the buck-boost voltage converter 110 performs the DC/AC conversion between the DC voltage source 40 and the second AC electrical network. Notably, an input terminal 111 of the buck-boost converter 110 is then connected to an output terminal 121 of the buck-boost converter 110. Such a DC/AC conversion by the buck-boost voltage converter 110 is notably made possible by switches T1, T2, referred to as toggle switches. These toggle switches T1, T2 make it possible to selectively connect one of the input terminals 111, 112 to a first 121 of the output terminals. In doing so, the switches T1, T2 determine the polarity of the energy source which is connected to the first output terminal 121. In particular, in the second operating mode, the switches T1, T2 make it possible to successively reverse the polarity of the DC voltage source 40 so as to deliver a positive or negative AC voltage at the output of the uninterruptible power supply circuit 100. Thus, the buck-boost voltage converter 110 may be used both in the first operating mode and in the second. This sharing of the electrical components between the circuit performing the AC/AC conversion and the one performing the DC/AC conversion makes it possible to decrease costs and to increase the power density of the uninterruptible power supply 100 with respect to the prior art. Also, in the second operating mode, the buck-boost voltage converter 110 notably makes it possible to control the frequency of the AC voltage delivered at the output. Thus, the frequency of the AC voltage at the output may be variable.

Notably, a first toggle switch T1 is connected between a first input terminal 111 of the buck-boost voltage converter 110 and the first output terminal 121 of the buck-boost voltage converter 110; and a second toggle switch T2 is connected between a second input terminal 112 of the buck-boost converter 110 and the first output terminal 121 of the buck-boost voltage converter 110. By virtue of this configuration, the switches T1, T2 make it possible to change, in the second operating mode, the polarity of the voltage source 40 across the input terminals 111, 112 of the buck-boost voltage converter 110 in a simple manner in order to implement the DC/AC conversion. Preferably, the switches T1, T2 are in complementary states. In other words, they are not open or closed at the same time.

In particular, the first output terminal 121 is connected, notably directly connected, to a negative terminal of the second AC electrical network; and the second output terminal 122 is connected, notably directly connected, to a positive terminal of the second AC electrical network.

The uninterruptible power supply circuit 100 may also comprise a first capacitor 132 at the interface between the uninterruptible power supply circuit 100 and the first AC electrical network 30 or the DC voltage source 40; and a second capacitor 134 between the uninterruptible power supply circuit 100 and the second AC electrical network. Thus, the first capacitor 132 may be connected between the input terminals 111, 112. The second capacitor 134 may be connected between the output terminals 121, 122.

Figure 2:
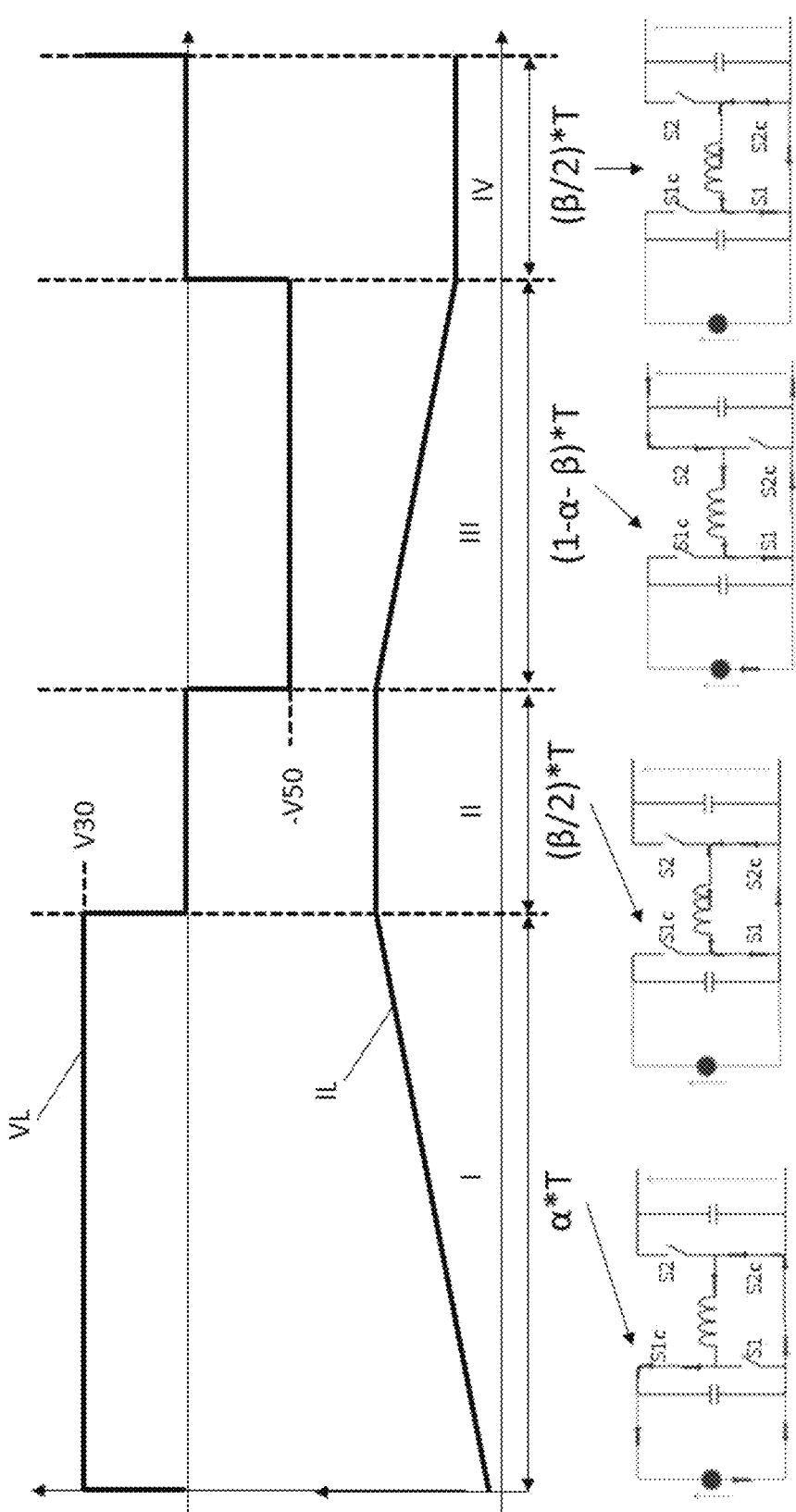
FIG. 2 illustrates a first operating mode of the circuit shown in FIG. 1.

The first operating mode of the power supply circuit 100 will now be described in more detail with reference to FIG. 2. FIG. 2 presents, in the top part, a trend of the voltage VL across the terminals of the inductor L and a trend of the current IL across the terminals of the inductor L. The circuit diagrams in the bottom part each show the state of the uninterruptible power supply circuit 100 and the current flowing therein in a part I, II, III, IV of a chopping period T of the switches S1, S1c, S2, S2c of the buck-boost voltage converter 110.

Notably, in the first operating mode, the first switch T1 is closed and the second switch T2 is open. In particular, the first input terminal 111 is then connected to a negative terminal of the first AC electrical network 30; and the second input terminal 112 is then connected to a positive terminal of the first AC electrical network 30.

Notably, the negative terminal of the first AC electrical network 30 connected to the first input terminal 111 forms a ground of the first AC electrical network 30; and the negative terminal of the second AC electrical network connected to the first output terminal 121 forms a ground of the second AC electrical network. Thus, a connection between the grounds of the first electrical network 30 and the second electrical network is easily obtained. Such a connection (also known as "neutral passing through") may be advantageous in uninterruptible power supplies. Such a connection is notably imposed by some standards relating to uninterruptible power supplies.

In particular, the switches S1, S1c, S2, S2c are switched with a switching frequency corresponding to the switching period T. The ratio between the input voltage V30 and the output voltage V50 notably depends on a duty cycle a of the opening of the switches S1, S1c, S2, S2c of the buck-boost voltage converter 110.

One example of the switches switching will be described below. In a first part I, of a duration $\alpha T$, of the switching period T, the first switch S1 of the first arm B1 is open and the second switch S1c of the arm is closed; and the first switch S2 of the second arm B2 is open and the second switch S2c of the arm is closed. The voltage VL across the terminals of the inductor L is then equal to that V30 of the first electrical network 30. The current IL passing through the inductor increases gradually. The energy coming from the first electrical network 30 then accumulates in the inductor L.

In an optional second part II, of a duration $(\beta/2)T$, of the switching period T, the first switch S1 of the first arm B1 is closed and the second switch S1c of the arm is open; and the first switch S2 of the second arm B2 is open and the second switch S2c of the arm is closed. This part II is a freewheel step which makes it possible to dissipate any residual charge and to avoid the switches breaking during the change between the first phase I and a third part III.

In the third part III, of a duration $(1-\alpha-\beta)T$, of the switching period T, the first switch S1 of the first arm B1 is closed and the second switch S1c of the arm is open; and the first switch S2 of the second arm B2 is closed and the second switch S2c of the arm is open. The energy accumulated in the inductor L during the first part I is discharged to the second AC electrical network. The voltage VL across the terminals of the inductor L is then equal to that V50 of the second electrical network. The current IL passing through the inductor decreases gradually.

In an optional fourth part IV, of a duration $(\beta/2)T$, of the switching period T, the first switch S1 of the first arm B1 is closed and the second switch S1c of the arm is open; and the first switch S2 of the second arm B2 is open and the second switch S2c of the arm is closed. This part IV is a freewheel step for attenuating the irregularities in the transition from the third part III to a first part I of the following switching period T. The voltage VL across the terminals of the inductor L is then zero. The current IL passing through the inductor remains substantially stable.

In FIG. 2, the arrows in the electrical circuits indicate the direction of the current. The directions indicated correspond to a positive half-period of the first AC electrical network. Over the negative half-period the currents are notably in the opposite direction.

The second operating mode of the power supply circuit 100 will now be described in more detail with reference to FIGS. 3 and 4. Notably, in the second operating mode, the first input terminal 111 is connected, notably directly connected, to a negative terminal of the DC voltage source 40; and the second input terminal 112 is connected, notably directly connected, to a positive terminal of the DC voltage source 40.

As in the first operating mode, the DC/AC conversion of the second operating mode relies notably on an accumulation of energy in the inductor L, which makes it possible to raise or lower the voltage between the input and the output, and thus to manage an AC voltage at the output. By virtue of the toggle switches T1, T2, the buck-boost voltage converter 110 may deliver at the output an AC signal having a positive half-period and a negative half-period. Specifically, the switches T1, T2 make it possible to connect the DC voltage source 40 to the buck-boost converter 110 with a first polarity during a positive half-period of the AC voltage V50 of the second electrical network; and the switches T1, T2 make it possible to connect the DC voltage source 40 to the buck-boost converter 110 with a second polarity, which is the reverse of the first, during a negative half-period of the AC voltage V50 of the second electrical network.

Figure 3:
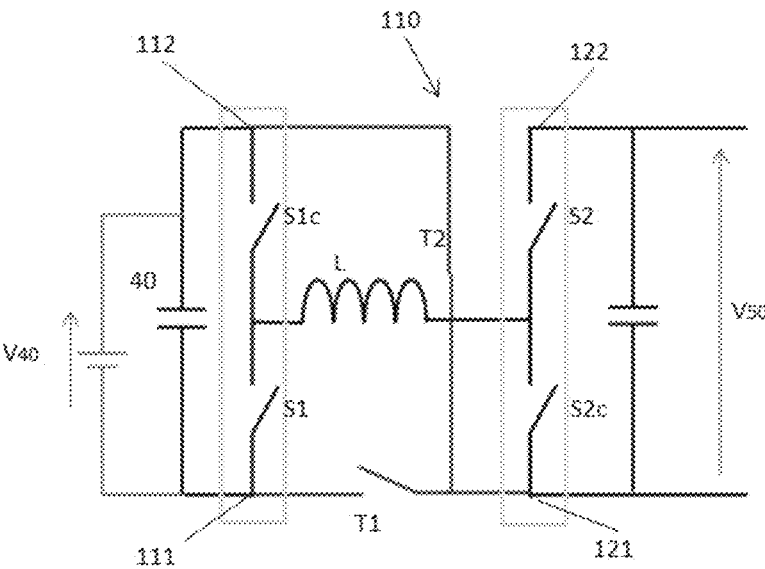
FIG. 3 illustrates part of a second operating mode of the circuit illustrated in FIG. 1.

In particular, as, for example, illustrated in FIG. 3, over the negative half-period of the AC voltage V50 of the second electrical network, the first switch T1 is open and the second switch T2 is closed. Thus, the second input terminal 112 is connected to the first output terminal 121. In particular, the positive terminal of the voltage source 40 is connected to the negative terminal of the second AC electrical network. The switches S1, S1c, S2, S2c of the buck-boost voltage converter 110 are then controlled at a switching frequency, notably similarly to the first operating mode, so as to deliver the negative half-period of the voltage V50 of the second AC electrical network.

Figure 5:
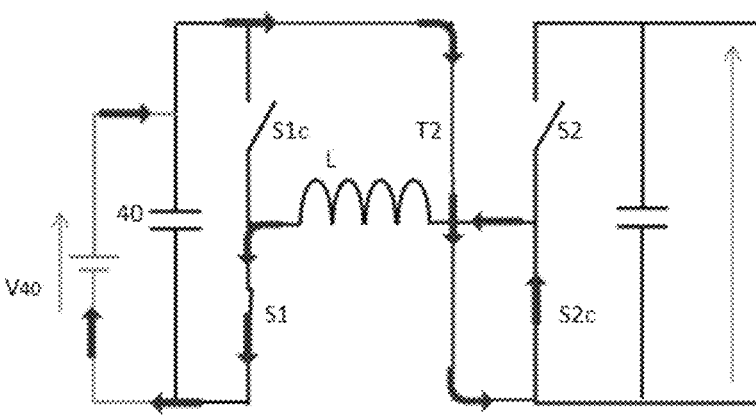
FIG. 5 shows a flow of current through the circuit of FIG. 1.
Figure 6:
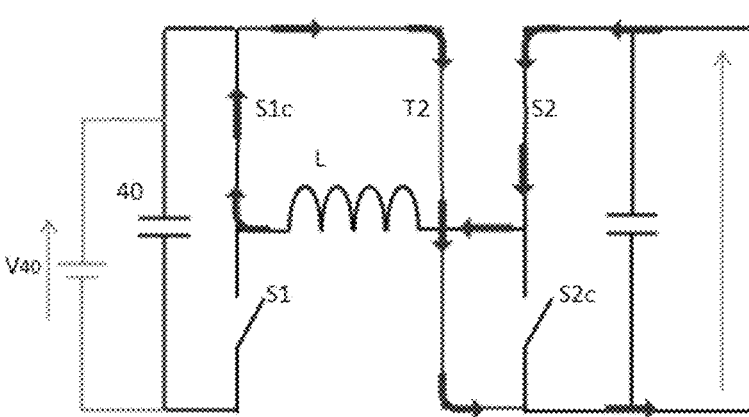
FIG. 6 shows a flow of current through the circuit of FIG. 1.

More particularly in the negative half-period, as, for example, illustrated in FIG. 5, in a first part, of a duration αT, of the switching period T, the first switch S1 of the first arm B1 is closed and the second switch S1c of the arm is open; and the first switch S2 of the second arm B2 is open and the second switch S2c of the arm is closed. The energy coming from the DC voltage source 40 then accumulates in the inductor L. In particular, as, for example, illustrated in FIG. 6, in a successive part, of a duration (1−α)T, of the switching period T, the first switch S1 of the first arm B1 is open and the second switch S1c of the arm is closed; and the first switch S2 of the second arm B2 is closed and the second switch S2c of the arm is open. The energy accumulated in the inductor L during the first phase illustrated in FIG. 5 is discharged into the second electrical network. An optional freewheel part, in which the second switch S1c of the first arm B1 and the second switch S1c of the second arm B2 are closed, may be inserted between the parts illustrated in FIGS. 5 and 6.

Figure 4:
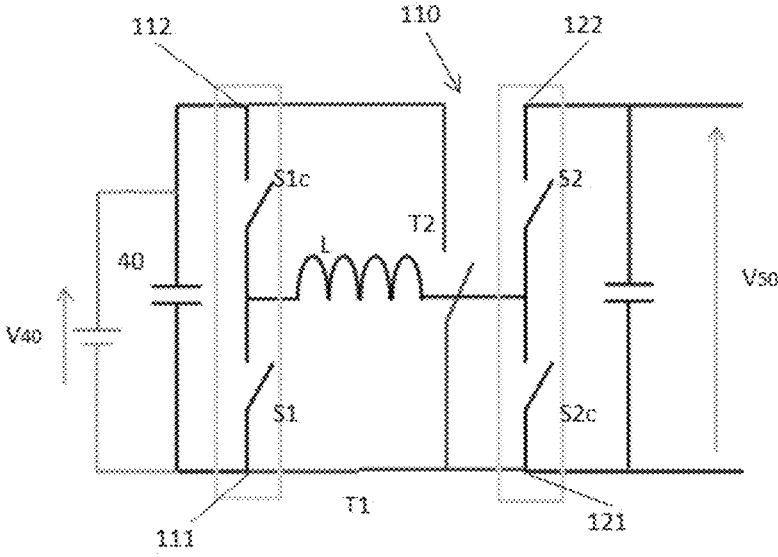
FIG. 4 illustrates another part of the second operating mode.

In particular, as, for example, illustrated in FIG. 4, over the positive half-period of the AC voltage V50 of the second electrical network, the first switch T1 is closed and the second switch T2 is open. Thus, the first input terminal 111 is connected to the first output terminal 121. In particular, the negative terminal of the voltage source 40 is connected to the negative terminal of the second AC electrical network. The switches S1, S1c, S2, S2c of the buck-boost voltage converter 110 are then controlled at a switching frequency, notably similarly to the first operating mode, so as to deliver the positive half-period of the voltage V50 of the second AC electrical network.

With reference to FIG. 1 again, the uninterruptible power supply circuit 100 notably transitions from the first to the second operating mode and vice versa by virtue of a set of switches R1, R2, R3.

In particular, two switches R1, R2 make it possible to connect the first AC electrical network 30 to the uninterruptible power supply circuit 100 in the first configuration (first operating mode). In the second configuration (second operating mode), the switches R1, R2 disconnect the first electric power supply 30. To this end, a first switch R1 is preferably connected between the first input terminal 111 of the buck-boost voltage converter 110 and a first terminal of the first electrical network 30. A second switch R2 is preferably connected between the second input terminal 112 of the buck-boost voltage converter 110 and a second terminal of the first electrical network 30. These two switches R1, R2 are notably configured to open or close simultaneously.

Notably, the set of switches also comprises a third switch R3 which, in the first configuration, disconnects the DC voltage source 40 from the buck-boost voltage converter 110; and, in the second configuration, connects the DC voltage source 40 to the buck-boost voltage converter 110. In particular, a first terminal of the voltage source 40 is connected to the first input terminal 111; and the third switch R3 is connected between a second terminal of the DC voltage source 40 and the second input terminal 112. The set of switches R1, R2, R3 might have a different configuration. For example, a switch might be connected between the first terminal of the voltage source 40 and the first input terminal 111. The switches R1, R2, R3 are controlled by a controller/control unit. They may be designed in the form of relays. The controller may be integrated into the buck-boost voltage converter, or indeed be a component which is external to it.

Because they switch at the switching frequency, the switches S1, S1c, S2, S2c of the buck-boost voltage converter 110 are preferably produced using a technology which tolerates high frequencies, such as, for example, GaN or SiC technology. The switching frequency is, for example, between 50 kHz and 100 kHz. It may be lower or higher depending on the technology of the switches and on the value of the inductor L.

Notably, the toggle switches T1, T2 switch at relatively lower frequencies. In particular, in the second operating mode, the toggle switches T1, T2 switch at a frequency of between 50 and 60 Hz. The switching frequency of the toggle switches may be lower or higher, for example of the order of a few kilohertz, depending on the frequency of the AC voltage delivered at the output of the buck-boost voltage converter 110. Notably, the toggle switches T1, T2 are made using silicon, notably MOSFET, technology.

Preferably, the buck-boost voltage converter 110 is reversible. It may then transmit power from the input terminals 111, 112 to the output terminals 121, 122, or from the output terminals 121, 122 to the input terminals 111, 112. To this end, the switches S1, S1c, S2, S2c of the arms B1, B2 are notably bidirectional in terms of current and in terms of voltage. The switches S1, S1c, S2, S2c are then, for example, made using GaN, notably GaN HEMT, technology. The bidirectionality of a switch S1, S1c, S2, S2c of the buck-boost voltage converter 110 may be produced by associating transistors, notably SiC MOSFETs. The second toggle switch T2, notably both the toggle switches T1, T2, may be bidirectional. The transistor T1 may be a MOSFET.

Figure 7:
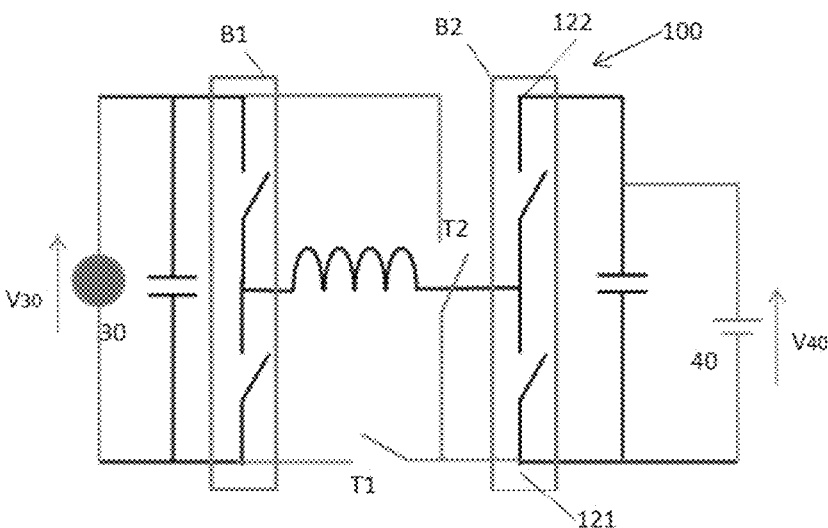
FIG. 7 illustrates a third operating mode of the uninterruptible power supply circuit.

The uninterruptible power supply circuit 100 may have a third operating mode, for example illustrated in FIG. 7. In this third operating mode, the DC voltage source 40 supplies power to the first AC electrical network 30. To this end, the uninterruptible power supply circuit 100 may comprise additional switches, notably relays, for connecting the terminals of the DC voltage source 40 to the output terminals 121, 122 of the buck-boost voltage converter 110. Notably, by virtue of its reversibility in terms of power, the buck-boost voltage converter 110 may send power from the DC voltage source 40 to the first AC electrical network 30. The buck-boost voltage converter 110 then has operation similar to that in the second operating mode. Over the positive half-period of the AC voltage V30 of the first electrical network 30, the first switch T1 is closed and the second switch T2 is open. Over the negative half-period of the AC voltage V30 of the first electrical network 30, the first switch T1 is open and the second switch T2 is closed.

In this third operating mode, power is transferred from the DC voltage source 40 to the first AC electrical network 30: the transistors S1, S1c, S2, S2c are therefore controlled with the following sequences depending on the sign of the AC voltage V30:

If Voltage V40 positive (first switch T1 closed and second switch T2 open):
first phase, during which the inductor is charged with the battery: S1 and S2 closed
second, freewheel phase: S1 and S2c closed
third, discharge phase: S1c and S2c closed
If Voltage V40 Negative (T2 Closed and T1 Open):
first phase, during which the inductor is charged with the battery: S1c and S2 closed
second, freewheel phase: S1c and S2c closed
third, discharge phase: S1 and S2c closed.

The invention claimed is:
1. A power supply circuit configured to, in a first operating mode, supply power to a second AC electrical network from a first AC electrical network; and, in a second operating mode, supply power to the second AC electrical network from a DC voltage source, said circuit comprising a buck-boost voltage converter comprising:

two input terminals;

a first switch (R1), a second switch (R2) and a third switch (R3);

a controller configured to control the first switch (R1), the second switch (R2) and the third switch (R3) so that:

in a first operating mode, the input terminals receive, between them, an AC voltage (V30) from the first network when the first switch (R1) and the second switch (R2) are closed and when the third switch (R3) is open, in a second operating mode, the input terminals receive, between them, a DC voltage (V40) from the DC voltage source when the first switch (R1) and the second switch (R2) are open and when the third switch (R3) is closed;

two output terminals configured to, in the first and the second operating mode, receive, between them, an AC voltage (V50) from the second AC electrical network;

said buck-boost voltage converter being configured to transition, without interruption, from the first operating mode to the second operating mode and vice versa, said buck-boost voltage converter being further configured to perform an AC/AC conversion between the first AC electrical network and the second AC electrical network in the first operating mode.

2. The power supply circuit according to claim 1, wherein the buck-boost voltage converter comprises:

a first switch arm (B1) and a second switch arm (B2), each arm comprising two switches having a common terminal, referred to as the midpoint;

an inductor (L) connected between the midpoints of the first and second switch arms (B1, B2);

end terminals of the first arm (B1) forming said input terminals of the buck-boost converter, end terminals of the second arm (B2) forming said output terminals of the buck-boost converter, the power supply circuit being configured to connect an input terminal to an output terminal during operation of the uninterruptible power supply circuit.

3. The power supply circuit according to claim 1, wherein said buck-boost voltage converter is configured to, in the second operating mode, perform a DC/AC conversion between the DC voltage source and the second AC electrical network.

4. The power supply circuit according to claim 1, comprising switches (T1, T2), referred to as toggle switches, configured to selectively connect one of the input terminals to a first of the output terminals.

5. The power supply circuit according to claim 4, wherein a first toggle switch (T1) is connected between a first input terminal of the buck-boost voltage converter and the first output terminal of the buck-boost voltage converter; and a second toggle switch (T2) is connected between a second input terminal of the buck-boost voltage converter and the first output terminal of the buck-boost voltage converter.

6. The power supply circuit according to claim 5, configured so that, in the first operating mode, the first switch (T1) is closed and the second switch (T2) is open.

7. The power supply circuit according to claim 6, configured so that, in the first operating mode, a terminal of the first AC electrical network connected to the first input terminal forms a ground which can be directly connected to the ground of the first AC electrical network; and a terminal of the second AC electrical network connected to the first output terminal forms a ground which can be directly connected to the ground of the second AC electrical network.

8. The power supply circuit according to claim 5, configured so that, in the second operating mode:

over the positive half-period of the AC voltage (V50) of the second electrical network, the first toggle switch (T1) is closed and the second toggle switch (T2) is open; and over the negative half-period of the AC voltage (V50) of the second electrical network, the first toggle switch (T1) is open and the second toggle switch (T2) is closed.

9. The power supply circuit according to claim 5, configured to, in a third operating mode, supply power to the first AC electrical network from the DC voltage source, and so that, in said third operating mode:

over the positive half-period of the AC voltage (V30) of the first electrical network, the first toggle switch (T1) is closed and the second toggle switch (T2) is open; and over the negative half-period of the AC voltage (V30) of the first electrical network, the first toggle switch (T1) is open and the second toggle switch (T2) is closed.

10. The power supply circuit according to claim 1, wherein the buck-boost voltage converter is reversible.

* * * * *